United States Patent
Kornby

Patent Number: 5,930,725
Date of Patent: Jul. 27, 1999

[54] WIRELESS TERMINAL

[75] Inventor: Michael Kornby, Lund, Sweden

[73] Assignee: Telefonaktiebolaget LM Ericsson, Stockholm, Sweden

[21] Appl. No.: 09/015,329

[22] Filed: Jan. 29, 1998

[30] Foreign Application Priority Data

Jan. 30, 1997 [SE] Sweden .................................. 9700279

[51] Int. Cl.⁶ .................................................. H04M 1/00
[52] U.S. Cl. ............................. 455/552; 455/550; 330/51
[58] Field of Search ................................ 455/436, 550, 455/552, 553, 557, 556, 558, 559; 375/316, 216; 330/51; 370/466, 467

[56] References Cited

U.S. PATENT DOCUMENTS

| | | | |
|---|---|---|---|
| 5,008,925 | 4/1991 | Pireh .................................... | 455/552 |
| 5,020,092 | 5/1991 | Phillips et al. ....................... | 455/552 |
| 5,228,074 | 7/1993 | Mizikovsky ......................... | 455/553 |
| 5,396,653 | 3/1995 | Kivari et al. ......................... | 455/88 |
| 5,406,615 | 4/1995 | Miller, II et al. .................... | 455/552 |
| 5,422,931 | 6/1995 | Austin-Lazarus et al. ........... | 455/553 |
| 5,446,422 | 8/1995 | Mattila et al. ....................... | 332/103 |
| 5,490,275 | 2/1996 | Sandvos et al. ..................... | 395/673 |
| 5,497,373 | 3/1996 | Hulen et al. ......................... | 370/259 |
| 5,535,432 | 7/1996 | Dent ..................................... | 455/77 |
| 5,564,076 | 10/1996 | Auvray ................................. | 455/76 |
| 5,642,378 | 6/1997 | Denheyer et al. ................... | 375/216 |
| 5,659,598 | 8/1997 | Byrne et al. ......................... | 455/436 |
| 5,668,837 | 9/1997 | Dent ..................................... | 375/316 |
| 5,774,017 | 6/1998 | Adar .................................... | 330/51 |

FOREIGN PATENT DOCUMENTS

| | | |
|---|---|---|
| 0 521 609 | 5/1992 | European Pat. Off. . |
| 06 31 400 | 6/1994 | European Pat. Off. . |
| 43 44 702 | 7/1995 | Germany . |
| 4-348624 | 12/1992 | Japan . |
| 5-22221 | 1/1993 | Japan . |
| 06260961 | 9/1994 | Japan . |
| 2 269 723 | 2/1994 | United Kingdom . |
| 2 292 653 | 7/1995 | United Kingdom . |
| 2 292 047 | 2/1996 | United Kingdom . |
| 95/23485 | 8/1995 | WIPO . |
| 95/23488 | 8/1995 | WIPO . |
| 96/08878 | 3/1996 | WIPO . |
| 96/08883 | 3/1996 | WIPO . |

*Primary Examiner*—Wellington Chin
*Assistant Examiner*—Isaak R. Jama
*Attorney, Agent, or Firm*—Burns, Doane, Swecker & Mathis, L.L.P.

[57] ABSTRACT

In a wireless terminal adapted to operate according to more than one air interface protocol, processing circuits are provided to process signals received by the terminal or to be transmitted by the terminal according to the respective protocol. One of the processing circuits is chosen to be connected to user interface equipment of the terminal to communicate with that equipment also on behalf of the other processing circuits according to a user interface equipment signal format. The other processing circuits communicate with that one processing circuit via a bus according to a bus signal format. The one processing circuit converts the bus signal format to the user interface equipment signal format and vice versa when the terminal is operating according to the protocol of any of the other processing circuits (2-4).

1 Claim, 1 Drawing Sheet

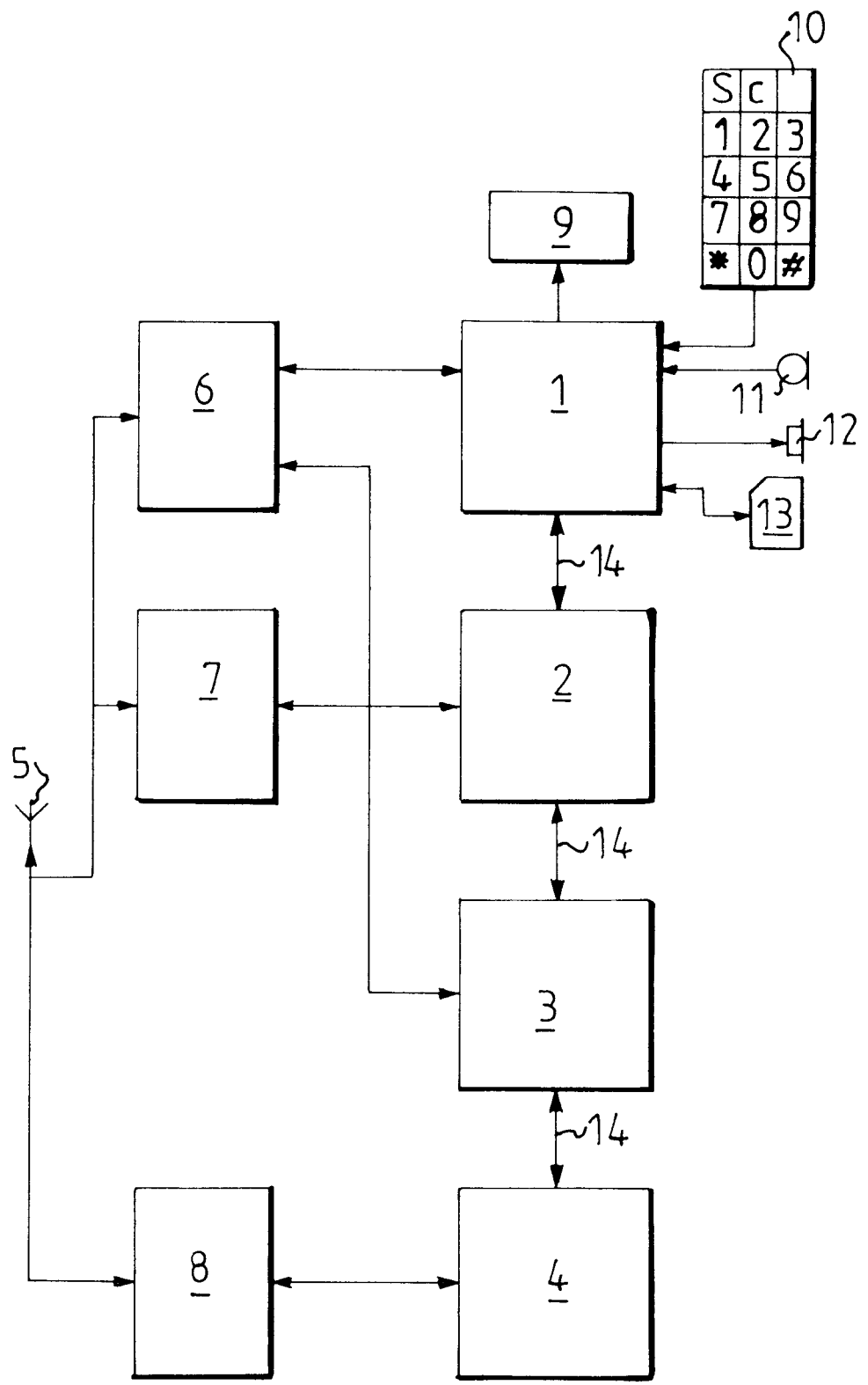

WIRELESS TERMINAL

TECHNICAL FIELD

The invention relates to a wireless terminal, e.g. a mobile phone, which is able to operate in accordance with at least two different air interface protocols.

BACKGROUND

The proliferation of different air interface protocol standards for wireless communication places increasing requirements on wireless terminals to be able to operate according to more than one of these standards.

A wireless terminal which is adapted to operate both as a GSM terminal and as a DECT terminal is known e.g. from DE 43 44 702 A1. The known terminal comprises an antenna which is connected to one RF part for GSM operation and to another RF part for DECT operation. The RF parts are via GSM mode components and DECT mode components, respectively, connected to a common mode controller. In its turn, the common mode controller is connected to user panel with a display and a keyboard and via a common speech processor to a loudspeaker and a microphone.

SUMMARY

The object of the invention is to bring about a wireless terminal which is able to operate according to more than one air interface protocol and whose design is simpler than such known wireless terminals.

This is attained by the wireless terminal according to the invention in that all processing circuits are interconnected by means of a bus and that one of the processing circuits is adapted to communicate with the user interface equipment on behalf of all other processing circuits.

Communication with the user interface equipment takes place in accordance with a signal format which differs from the signal format according to which the communication between the processing circuits takes place via the bus. To accomplish this, the processing circuit communicating with the user interface equipment converts the user interface equipment signal format to the bus signal format and vice versa when the terminal is operating in accordance with the protocol of one of the other processing circuits.

With this design, the wireless terminal according to the invention exhibits less wiring and, in comparison with the above known terminal, no separate common mode controller is needed.

BRIEF DESCRIPTION OF THE DRAWING

The invention will be described more in detail below with reference to the appended drawing, on which the single figure is a block diagram of an embodiment of a wireless terminal according to the invention.

DETAILED DESCRIPTION

The drawing shows a block diagram of one embodiment of a wireless terminal according to the invention. The terminal shown on the drawing is supposed to be able to operate in accordance with four different air interface protocols. For that purpose, the terminal comprises four different digital processing circuits 1, 2, 3 and 4. The processing circuits 1, 2, 3 and 4 are adapted to process signals received by the terminal or to be transmitted by the terminal according to a first, second, third and fourth protocol, respectively. It should however be understood that the processing circuits do not necessarily have to be separate circuits but may instead be parts or regions of a single, larger circuit, e.g. an ASIC (Application Specific Integrated Circuit).

In the embodiment shown, the processing circuits 1, 2, 3 and 4 are connected to an antenna 5 via RF parts 6, 7 and 8. The RF part 6 is supposed to handle signals according to both the first and the third protocol and is, consequently, connected to the processing circuit 1 as well as to the processing circuit 3. The RF part 7 is supposed to handle signals according to the second protocol and is connected to the processing circuit 2. The RF part 8 finally is supposed to handle signals according to the fourth protocol and is connected to the processing circuit 4.

If necessary, the terminal may be provided with more than one antenna 5. Also, it may be possible to combine all the RF parts 6, 7 and 8 into one and the same RF part.

In accordance with the invention, one of the digital processing circuits is connected to user interface equipment of the terminal. The user interface equipment comprises in the embodiment shown a display 9, a keyboard 10, a microphone 11, an earphone 12, and a SIM card 13. It is however to be understood that the user interface equipment may comprise other devices. In the embodiment shown on the drawing, it is supposed that the processing circuit 1 is connected to the user interface equipment 9–13.

Also, in accordance with the invention, the processing circuits 2, 3 and 4 are adapted to communicate with the user interface equipment of the terminal via the processing circuit 1 and are for that purpose interconnected with the processing circuit 1 via a bus 14.

The processing circuit 1 is adapted to communicate with the user interface equipment 9–13 according to a user interface equipment signal format to suit the respective requirements of the different devices of the user interface equipment. Moreover, in accordance with the invention, the processing circuit 1 is adapted to communicate with the processing circuits 2, 3 and 4 via the bus 14 according to a bus signal format. To this end, the processing circuit 1 in the embodiment shown, is adapted to convert the user interface equipment signal format to the bus signal format and vice versa when the terminal operates in accordance with the protocol of any of the processing circuits 2, 3 and 4.

If a call to the terminal shown on the drawing is established e.g. in accordance with the second protocol, incoming signals are detected by the RF part 7 and are processed to the bus signal format by the processing circuit 2. The processed signals are then communicated via the bus 14 to the first processing circuit 1 which converts the bus signal format of the signals into signals of the user interface equipment signal format. These signals are communicated to the user interface equipment in question, e.g. the earphone 12.

In the outgoing direction, speech picked up by the microphone 11 is processed by the processing circuit 1 and communicated to the processing circuit 2 via the bus 14 in accordance with the bus signal format. These signals to be transmitted by the terminal are processed by the processing circuit 2 according to the second protocol and are communicated to the RF part 7 to be transmitted by the antenna 5.

In accordance with the invention, by interconnecing the processing circuits by means of a bus and by using one of the processing circuits both for processing signals according to one of the protocols and for communicating with the user interface equipment on behalf of the other processing circuits, the terminal according to the invention comprises less wiring than the prior art terminals.

I claim:

1. A wireless terminal adapted to operate according to more than one air interface protocol, comprising user interface equipment common to the protocols, and processing circuits adapted to process signals received by the terminal or to be transmitted by the terminal according to one of the protocols, wherein one of the processing circuits is connected to said user interface equipment and is adapted to communicate with that equipment according to a first signal format, therefore the other processing circuits are interconnected with said one processing circuit via a bus and are adapted to communicate with that one processing circuit according to a second signal format, and said one processing circuit is adapted to convert said first signal format to the second signal format and vice versa when the terminal is operating according to the protocol of any of said other processing circuit, wherein the other processing circuits communicate with the user interface equipment via the one processing circuit.

* * * * *